US 6,170,896 B1

(12) United States Patent
Harris et al.

(10) Patent No.: US 6,170,896 B1
(45) Date of Patent: Jan. 9, 2001

(54) TRUCK BED BRACKETS

(75) Inventors: Hugh Harris, Garden City; Steve J. Speth, Orchard Lake, both of MI (US)

(73) Assignee: Chrysler Corporation, Auburn Hills, MI (US)

( * ) Notice: Under 35 U.S.C. 154(b), the term of this patent shall be extended for 0 days.

(21) Appl. No.: 09/093,762

(22) Filed: Jun. 9, 1998

(51) Int. Cl.$^7$ .................................................. B60P 7/35
(52) U.S. Cl. ........................ 296/3; 296/183; 410/144; 410/129
(58) Field of Search .......................... 296/39.2, 3, 183; 410/32, 89, 129, 140, 141, 143, 144, 151; 105/372

(56) References Cited

U.S. PATENT DOCUMENTS

| 1,499,229 | * | 6/1924 | Laffey | 280/25 |
| 2,149,015 | * | 2/1939 | Giddings | 105/372 |
| 2,574,483 | * | 11/1951 | Jack | 296/3 |
| 2,988,018 | * | 6/1961 | Stough | 410/89 |
| 4,396,324 | * | 8/1983 | Ellis | 293/3 |
| 4,444,427 | * | 4/1984 | Martin | 296/3 |
| 4,507,033 | * | 3/1985 | Boyd | 410/140 X |
| 4,779,916 | * | 10/1988 | Christie | 296/3 |
| 4,938,403 | * | 7/1990 | Cortelli | 410/129 X |
| 4,958,876 | | 9/1990 | Diaco et al. . | |
| 5,431,472 | * | 7/1995 | Coffland | 296/3 |
| 5,788,309 | * | 8/1998 | Emery et al. | 410/129 X |

* cited by examiner

Primary Examiner—D. Glenn Dayoan
Assistant Examiner—Jason Morrow
(74) Attorney, Agent, or Firm—Roland A. Fuller, III

(57) ABSTRACT

A support bracket kit, particularly for use with vehicles having a cargo storage area including sidewalls, a bottom wall, and a pair of wheel wells. The kit is comprised of at least one cross-beam for disposition generally between upper portions of the wheel wells. A plurality of corner support brackets are disposed between the sidewalls and the floor in each corner of the cargo storage area. The support bracket kit allows a cargo box of a pick-up truck to be adapted to receive, for example, four-by-eight-foot sheets of plywood or drywall which are supported above the wheel wells by the support bracket kit.

8 Claims, 3 Drawing Sheets

TRUCK BED BRACKETS

BACKGROUND OF THE INVENTION

1. Field of the Invention

The present invention generally relates to support brackets for use in a cargo carrying vehicle and, more particularly, to a kit of improved support brackets for use in the bed of a pick up truck.

2. Background and Summary of the Invention

In general, the cargo storage compartment associated with both pick-up trucks and some closed top vehicles such as vans are designed to provide as much room for cargo storage as allowable by the given vehicle design. To accomplish this, the floor of the cargo storage area is lowered towards the ground as far as practical within the design limitations of the drive train of the vehicle. To accommodate the lowered floor location, wheel wells are typically provided on the floor and sidewalls of the storage compartment, and as such, provides a storage space with reduced cross sectional area in the lower portion of the vehicle's cargo bed.

For vehicles with cargo areas which have a pair of wheel wells, the transport of large sized cargo, for example a four foot by eight foot sheet of plywood or drywall, can only be accomplished by either angling the cargo between the wheel wells and outside of the storage box or balancing the cargo unstably on top of the wheel wells. The former can damage the cargo or the cargo storage compartment, and the latter is objectionable in that it is uncertain and dangerous.

SUMMARY OF THE INVENTION

In view of the foregoing, it is an object of the present invention to provide a mechanism for supporting cargo within the cargo storage area above the vehicle's wheel wells. More particularly, to provide a low cost kit which functions as a stable, support surface generally at the same level as the wheel wells for transporting large cargo. The related brackets have a connecting mechanism to facilitate connections to the walls and floor of the storage area.

It is a further object of the current invention to provide a kit which includes a cross-beam which is hollow and includes exterior mounting features. The hollow cross-beam member can easily facilitate storage of the other bracket members therein. The hollow cross-beam with the other bracket members stored therein provides a self storage system for the kit. As a self-contained unit, the kit can be easily stored in the truck, either in the truck bed or in the passenger compartment behind the seat. It is still a further object of the invention to provide the aforementioned kit which can additionally be connected to a pick-up truck bed liner placed within the cargo box.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

DETAILED DESCRIPTION OF THE PREFERRED EMBODIMENTS

The following description of the preferred embodiment is mainly exemplary in nature and is in no way intended to limit the invention or its application or uses.

Figure 1:
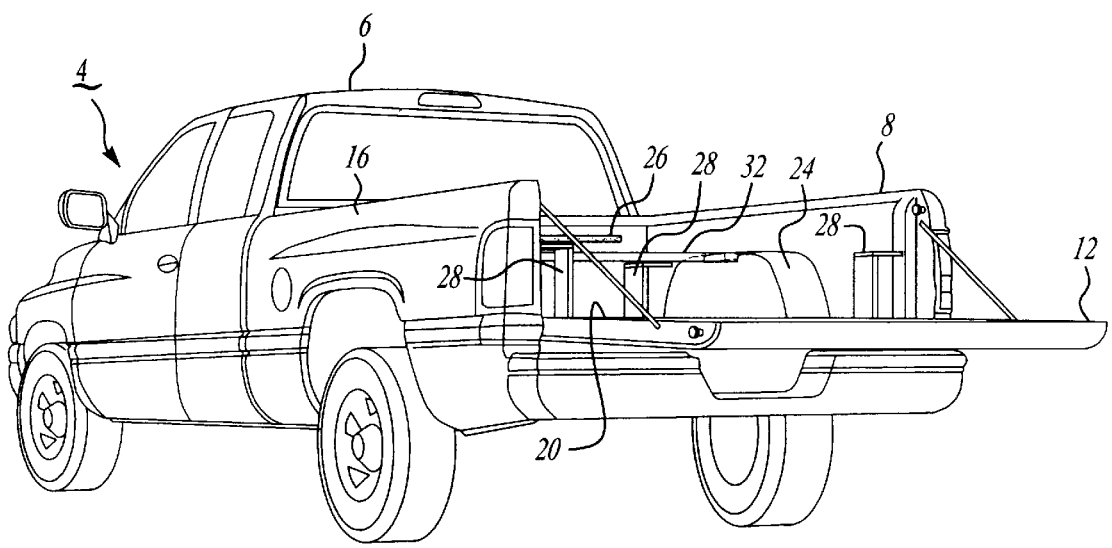
FIG. 1 shows a rear perspective view of a pick-up truck including the support system according to the principles of the present invention.

FIG. 1 shows a pick-up truck 4 having a cab 6, a cargo box 8 with a tailgate 12, sidewalls 16, floor 20, and a pair of wheel wells 24 (one shown). According to the present invention, angle brackets 28 are disposed in each corner of the cargo box 8. A cross-beam 32 extends between the wheel wells 24. A mounting strip 26, such as VELCRO®, is used to facilitate storage of the current invention along the front wall of the cargo box 8. Alternatively, the cross-beam can be stored within the passenger compartment behind the seat or on the tailgate.

Figure 2:
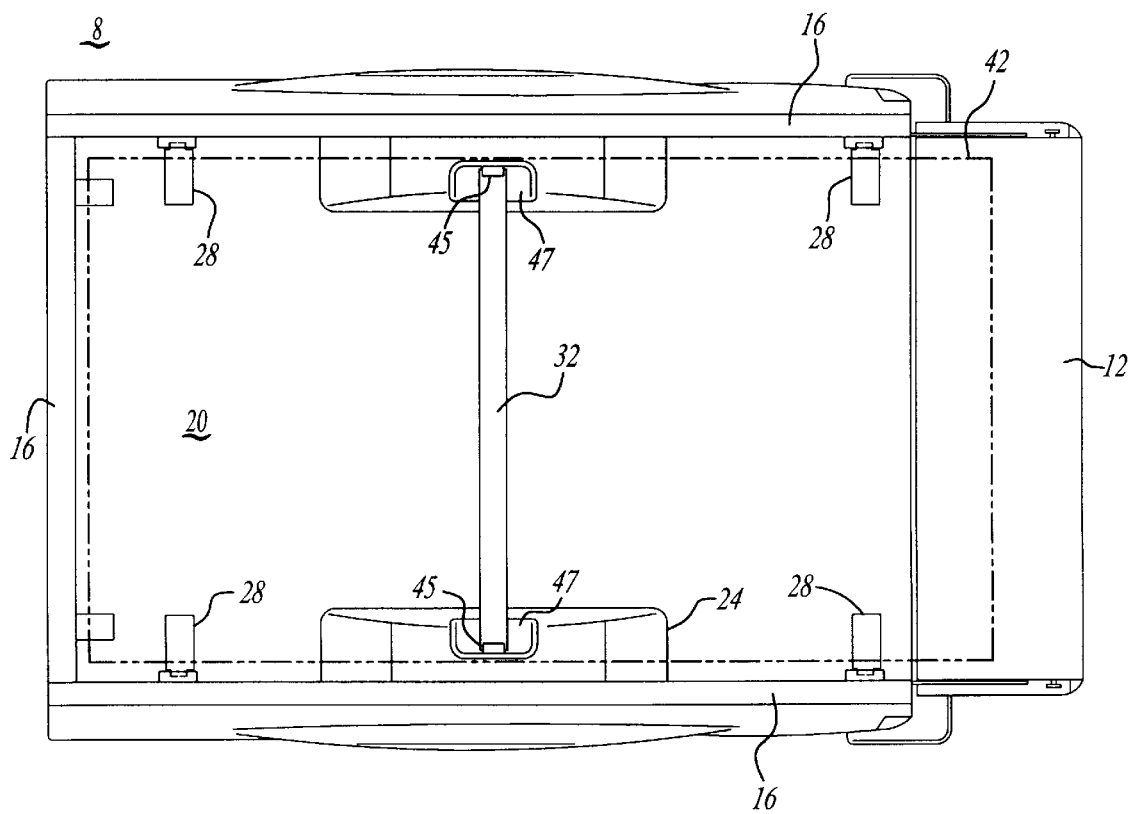
FIG. 2 shows a top view of the cargo box incorporating the support system of the current invention, having a large sheet of material supported thereon.
Figure 4:
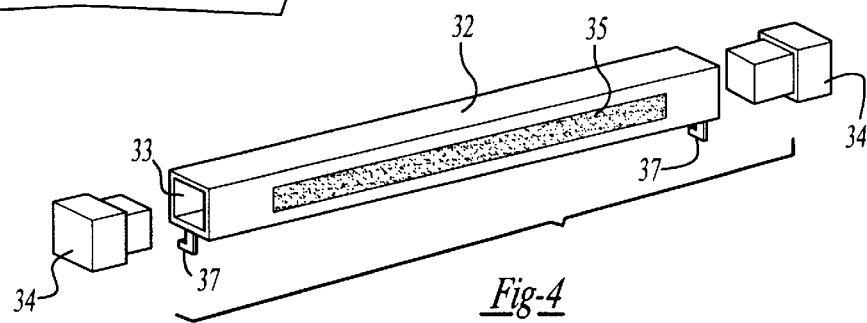
FIG. 4 shows the cross-beam of the current invention.

FIG. 2 shows a top view of the cargo box 8 having a tailgate 12, sidewalls 16, floor 20, and a pair of wheel wells 24. The wheel wells optionally include a mounting slot 45 disposed in recess portion 47 for receiving locking tabs 37 of the cross-beam 32 (FIG. 4). As can be seen, the cross-beam 32 is mounted between the upper surfaces of the wheel wells 24. Four angle brackets 28 are mounted in the corners of the cargo bed 8 and disposed between the sidewalls 16 and floor 20. A large cargo 42, such as a four-by-eight-foot sheet of material, shown in phantom, is disposed above the wheel wells 24 and centrally supported by the cross-beam 32 and at each of the corners by brackets 28.

Figure 3:
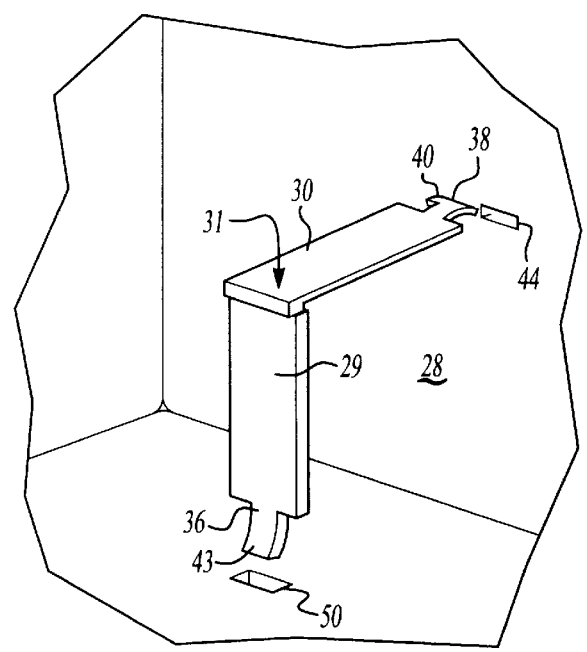
FIG. 3 illustrates one of the brackets of the current invention prior to insertion of the connecting tabs into the receiving slots disposed in the cargo box.
Figure 5:
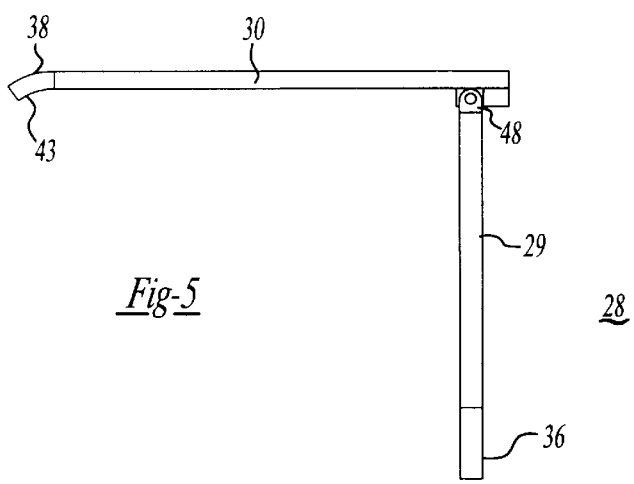
FIG. 5 shows the support bracket of the current invention in its open position.
Figure 6:
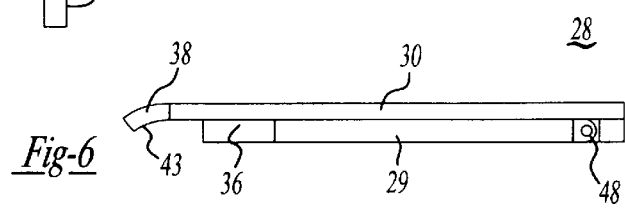
FIG. 6 shows a side view of the bracket of the current invention in its folded position.
Figure 7:
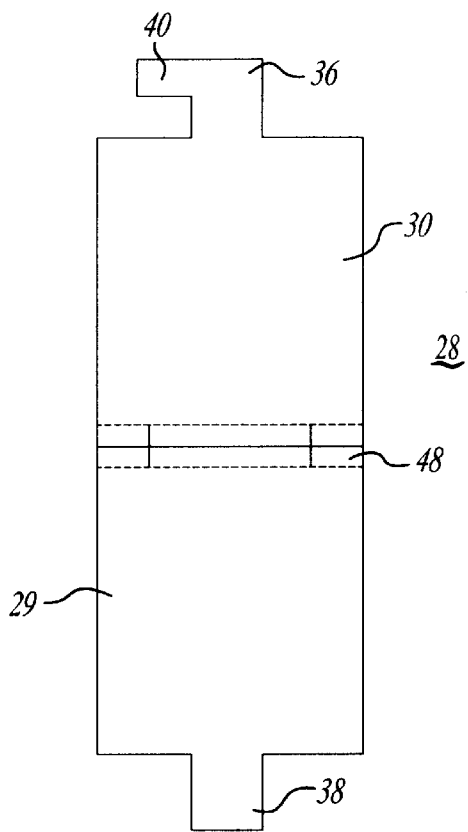
FIG. 7 shows a plan view of the brackets of the current invention.

As best seen in FIGS. 3, 5 and 7, the angle brackets 28 are formed by a first member 29 and a second member 30 connected together by a hinge 48. Second member 30 defines an upper support surface 31 on which sheet material may be supported. The first and second members 29, 30 each have a connecting tab 36, 38. The connecting tab 38 of second member 30 includes a locking portion 40 designed to couple in locking fashion with slots 44 located in sidewalls 16 of cargo bed 8. The connecting tab 36 is shown in FIGS. 5–7 as being generally straight, but can be provided with a locking portion or can be bent slightly as designated by reference numeral 43 in FIG. 3. The slight bend or a locking portion would prevent the lower member 29 from disengaging slot 50 if the vehicle hits a bump.

FIG. 4 shows the rectangular cross-beam 32 which defines a hollow cavity 33 therein. A pair of locking tabs 37 are optionally provided for mounting in slots 45 of the wheel wells 24. The cavity 33 is configured to provide a storage location to hold the angle brackets 28 when not in use. A pair of end caps 34 are provided for covering an opening to said hollow cavity 33. On the exterior of the cross-beam 32 is shown a strip of VELCRO® 35 to facilitate the storage of the cross-beam 32 and incorporated angle brackets 28 either within the cab 6 of truck 4 or within the cargo box 8 on mounting strip 26, as shown in FIG. 1.

FIG. 5 shows the angle bracket 28 in its open position. As can be seen, members 29 and 30 are connected by hinge 48 and separated for mounting into the slots 44, 50 within the vehicle cargo box 8.

FIG. 6 shows the angle bracket 28 folded so as to be in a stowing position with members 30 and 29 adjacent to each other. In the stowed position, angle bracket 28 can be stored in cavity 33 of cross-beam 32.

Figure 8:
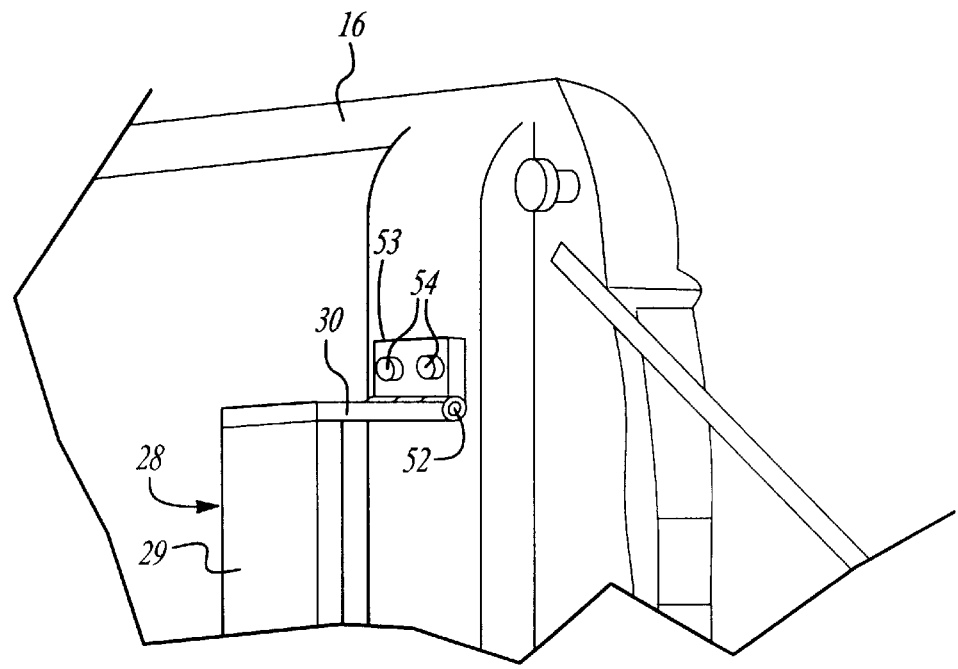
FIG. 8 shows an alternate connecting mechanism for the brackets of the current invention.

FIG. 8 shows an alternate connecting means in the form of a hinge 52 and a plate 53 which is fastened to the sidewalls 16 using threaded fasteners 54. According to this embodiment, the brackets can be folded in a suspended position when not in use.

Those skilled in the art can appreciate from this description that the broad teachings of the present invention can be implemented in a variety of forms. For example, any number of engagement mechanisms between the brackets and the cab cargo box 8 or a floor 20 are available. Further, the brackets can be designed to engage with a truck bed liner as opposed to the cargo box itself. The brackets can additionally be used within vans or sport utility vehicles having wheel wells which reduce the floor surface area of a storage compartment. Therefore, the true scope of the invention and other modifications will become apparent to the skilled practitioner upon the study of the drawings, specifications, and the following claims.

What is claimed is:

1. A support bracket system, particularly for use with a vehicle having a cargo storage area, said cargo storage area having sidewalls, a floor, and a pair of wheel wells, comprising in combination:

a cross-beam for disposition generally between upper surfaces of said wheel wells; and a plurality of support brackets each including a first member adapted to be coupled to said floor and a second member pivotally attached to said first member and adapted to be coupled to said sidewalls;

wherein said first and second members of said support brackets have connecting tabs adapted to be inserted in slots disposed in said sidewalls and said floor, respectively, of said cargo storage area.

2. The system of claim 1 wherein:

said cross-beam defines a cavity therein an open end adapted for receiving said plurality of support brackets into said cavity.

3. The system of claim 2 further comprising a cap for covering said open end in said cross-beam.

4. The system of claim 2, wherein said cross-beam includes an external attaching mechanism.

5. A pick-up truck, comprising:

a passenger compartment;

a cargo box disposed rearward of said passenger compartment, said cargo box having sidewalls including a pair of wheel wells and a floor disposed between said sidewalls;

a cross-beam extending between an upper portion of said wheel wells;

a plurality of corner support brackets disposed in corners of said cargo box, said corner support brackets each include a first member coupled to said sidewalls and a second member pivotally attached to said first member and coupled to said floor, said second member of each of said plurality of support brackets each including an upper support surface disposed generally at a level of an upper surface of the wheel wells; and wherein said first and second members of said corner support brackets have connecting tabs which are inserted in slots disposed in said sidewalls and said floor, respectively, of said cargo box.

6. The pick-up truck according to claim 5, wherein said cross-beam defines a cavity therein, said cross-beam having an open end adapted for receiving said plurality of corner brackets into said cavity.

7. The pick-up truck according to claim 5, wherein said cross-beam includes a cap for covering said open end in said cross-beam.

8. The pick-up truck according to claim 5, wherein said cross-beam includes an external attaching mechanism.

* * * * *